Oct. 30, 1951 A. H. HAWES 2,572,928
EXTENSIBLE TRESTLE
Filed Dec. 23, 1947 2 SHEETS—SHEET 1

INVENTOR
Albert Henry Hawes.
BY Otto Munk
HIS ATTORNEY.

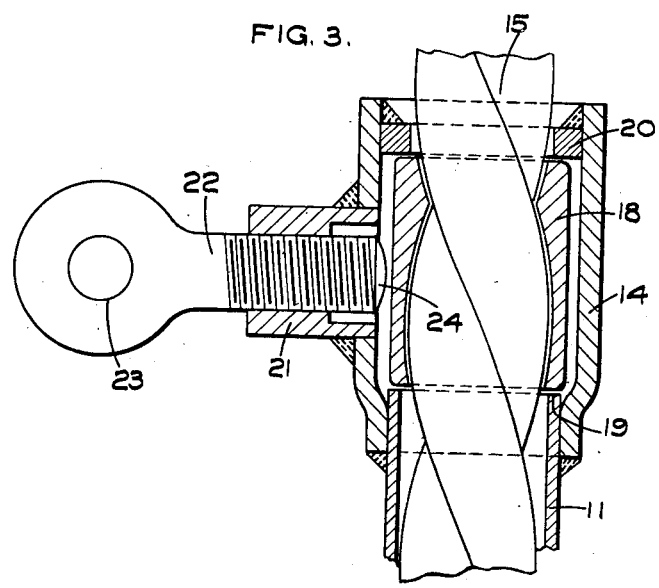
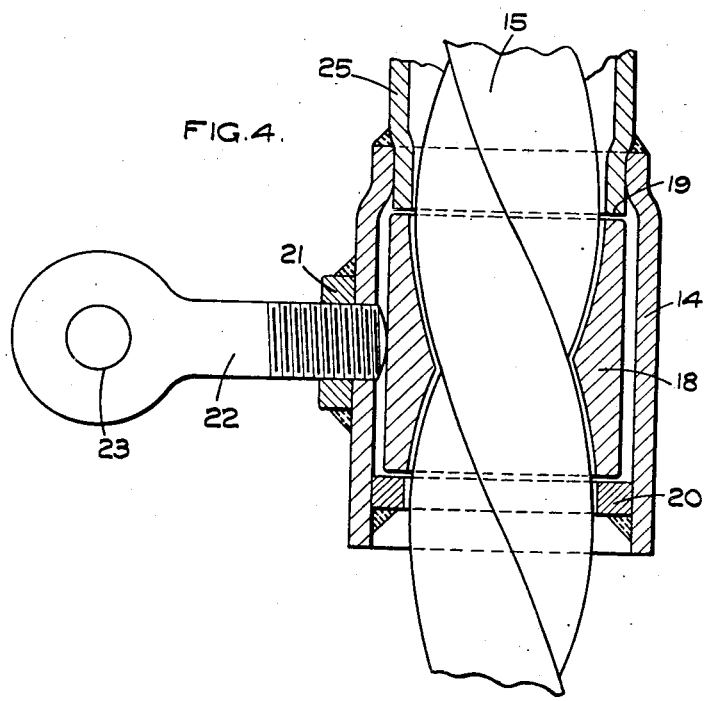

Patented Oct. 30, 1951

2,572,928

UNITED STATES PATENT OFFICE 2,572,928

EXTENSIBLE TRESTLE

Albert Henry Hawes, Birmingham, England, assignor to Kwikform Limited, Birmingham, England, a British company Application December 23, 1947, Serial No. 793,392
In Great Britain September 10, 1946

Section 1, Public Law 690, August 8, 1946
Patent expires September 10, 1966

1 Claim. (Cl. 304—6)

This invention relates to adjustable fittings for use with builders' equipment as well as for other purposes and is concerned with that type of fitting commonly known as a rising trestle and frequently employed for supporting one end of a horizontal plank or staging during the building operation.

The present invention has for its object the provision of an improved form of rising trestle embodying an improved arrangement for adjusting the height of the rising trestle and securing the same in its adjusted position.

Referring to the drawings,

Figures 3 and 4 are cross sectional views showing the details of the construction of the quick adjustment devices provided respectively with the fittings shown in Figures 1 and 2.

Figure 1:
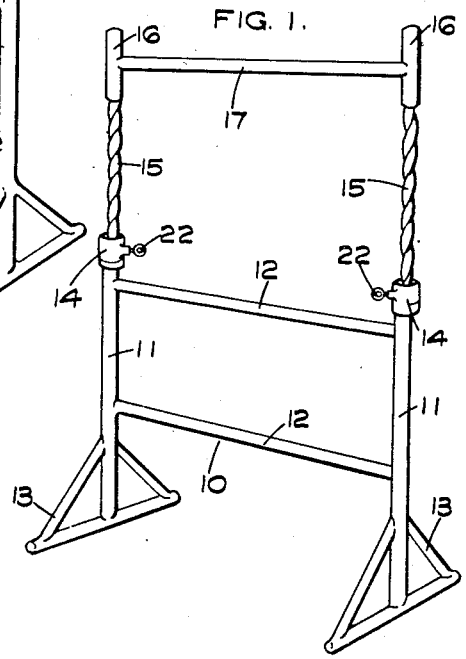

Referring firstly to Figures 1 and 3 of the drawings, the fitting shown in Figure 1 is known in the trade as a rising trestle and comprises a base portion 10 consisting of two vertical tubes 11 connected in spaced relationship by horizontal ties 12 and provided with braced feet 13.

The upper end of each tube 11 has welded to its exterior a tubular extension or sleeve 14 which, as shown in Figure 3, is apart from its lower end, of an internal diameter appreciably larger than the exterior diameter of the tube.

Extending vertically within each of the tubes 11 and their associated sleeves 14 is an elongated member 15 which in the particular arrangement illustrated is formed by taking a length of square section steel bar and twisting it about its axis so as to produce in effect a four-start screw thread having a relatively large pitch in relation to its diameter (for example, a pitch equal to about 10 times the maximum diameter of the bar).

The upper end of each bar 15 is secured non-rotatably within the lower end of a short piece of tube 16, the two tubes being joined by a supporting tie 17 upon which may be laid battens or platforms or any other member which it is desired to support during the use of the trestle for supporting builders' equipment in the known way.

As will be apparent from the foregoing description, each of the tubes 11 and the bars 15 therewithin are incapable of relative rotation, although with the construction as so far described the bars 15 can freely move vertically within their respective tubes so as to adjust the height of the trestle, i. e. the height of the supporting tie 17.

Mounted within each of the sleeves 14 so as to be freely rotatable therein around the longitudinal axis of the sleeve is a socket 18 having an internal screw thread of configuration corresponding to the screw thread on the bar 15 so as to be in threaded engagement therewith, and each socket is locked against axial movement in relation to its respective sleeve and tube by the lower end of the socket being adapted to engage with the upper end 19 of the tube 11, the upper end of the socket being engaged by a retaining ring 20 which is welded in position within the interior of the upper end of the sleeve 14 after the socket has been inserted in position. To permit of this the axial length of the sleeve is such that its upper end projects a short distance above the upper end of the socket.

Limited clearance is provided between each end of the socket and the tube end ring as well as between the exterior of the socket and the interior of the sleeve to permit of the socket freely rotating relative to the sleeve and tube.

The sleeve 14 is formed at one side with an opening in which is secured by welding a hollow boss 21 threaded internally and carrying a set screw 22 having the usual eye 23 for receiving a tommy-bar, the inner end 24 of the screw being adapted frictionally to engage the exterior of the socket so as to retain it against rotation.

In use when it is desired to adjust the height of the trestle each of the set screws 22 are slackened to permit of free rotation of the sockets 18, the tie 17 is grasped to raise it or lower it to the position desired, and during this movement the bars 15 move axially with respect to their sockets 18, the sockets rotating on the bars during such movement, and after the adjustment has been effected the set screws are tightened so as releasably to lock the sockets against rotation relative to their respective bars 15 so that the latter are held against axial movement relative to the tubes and the trestle is secured in the adjusted position.

Figure 2:
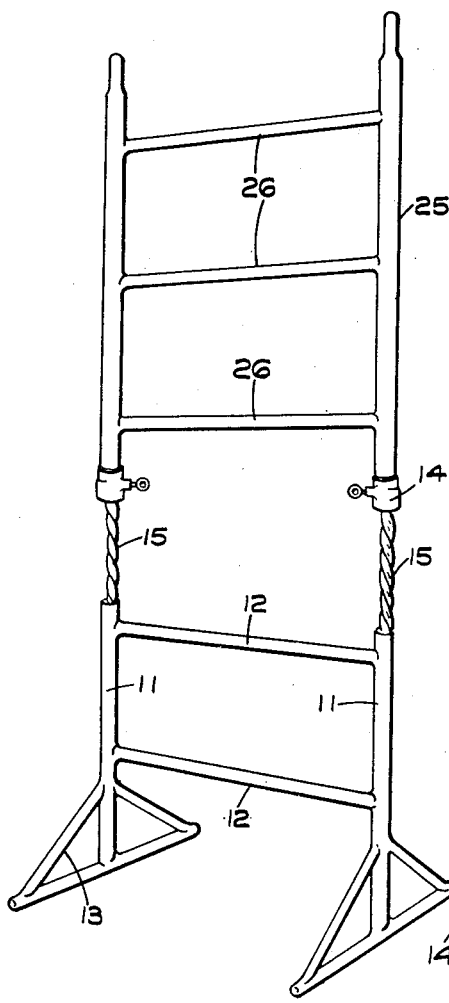
Figures 1 and 2 are perspective views of two forms of a fitting for use with builders' equipment and known as rising trestles.

The arrangement shown in Figures 2 and 4 of the drawings is very similar to that above described, but in this case the twisted bars 15 are secured non-rotatably within the interior of the vertical tubes 11, and the sleeves 14 are provided on the lower ends of tubes 25 constituting the vertical members of the adjustable part of the trestle, the tubes 25 being joined by a number of cross ties 26 instead of a single tie as in the case of the preceding construction. Each of these cross ties are adapted to support battens or other builders' equipment in the known manner. The actual operation and construction of the quick adjustment device is identical as with the preceding construction as will be apparent from the description and the drawings.

Figure 5:
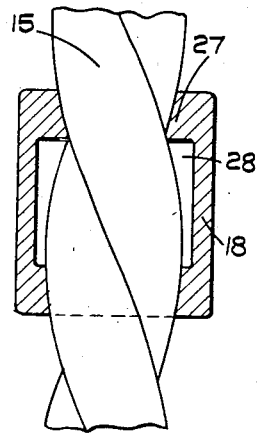
Figure 5 is a cross sectional view of part of the constructions shown in Figures 3 and 4 illustrating a modification.

Instead of making the interior of the socket 18 threaded throughout its length only the upper and lower ends 27 of the socket may have threaded engagement with the corresponding bar 15 as shown in Figure 5, the interior of the socket intermediate such ends being recessed internally to cylindrical configuration as indicated at 28. Such a construction possesses the advantage over the constructions previously described that the area of the engagement between the socket and the bar is reduced so that there is less friction between the socket and the bar than is the case with the preceding constructions, whereby relative adjustment of the two members of the fitting is facilitated.

In the specification of my co-pending application No. 627,002 I have described an adjustable fitting somewhat similar to the foregoing arrangement in which the set screw acts directly upon one of the faces of the twisted bar and is consequently liable to bite into these faces if unduly tightened so that damage thereto interfering to some extent with the rapid operation of the device may occur. This disadvantage may be avoided with the invention forming the present specification wherein the set screw or other locking means provided does not bear upon the twisted bar or other threaded elongated member itself, but merely operates between the socket and the member carrying the socket.

Furthermore, as compared, for example, with the construction shown in Figures 6 to 8 of my specification aforesaid in which sockets separate from the tubes which they support are provided and which rotate relative to the lower ends of such tubes which they support, the present invention provides a neater and more readily operated construction.

What I claim then is:

An adjustable support for scaffolds, trestles and the like having relatively movable upper and lower supporting frames, each frame comprising connected spaced, horizontal and vertical members, at least one vertical member of one frame comprising a tubular riser with a sleeve secured thereto at the extremity thereof, and at least one bar on the other frame, said bar having a multiple thread of elongated pitch and being relatively movable telescopically with respect to said riser and sleeve, a nut positioned within said sleeve and about said bar, said nut having an interior thread corresponding to that of the bar, and stop means at each end of said nut to retain it within said sleeve, said nut being freely rotatable therein during relative movements of said frames, said frames being relatively adjustable for substantially the full length of said bar, and fastening means on said sleeve selectively engageable with said nut for locking same against rotation to maintain said frames in any adjusted position with respect to one another.

ALBERT HENRY HAWES.

REFERENCES CITED

The following references are of record in the file of this patent:

UNITED STATES PATENTS

| Number | Name | Date |
| --- | --- | --- |
| 385,569 | Penfield | July 3, 1888 |
| 426,163 | Bergmann | Apr. 22, 1890 |
| 1,222,915 | Anderson | Apr. 17, 1917 |
| 1,405,238 | Lovelace | Jan. 31, 1922 |
| 1,654,763 | Tauscher | Jan. 3, 1928 |